(12) United States Patent
Lin

(10) Patent No.: US 8,774,149 B2
(45) Date of Patent: Jul. 8, 2014

(54) METHOD FOR ESTABLISHING NETWORK CONNECTIONS BETWEEN STATIONARY TERMINALS AND REMOTE DEVICES THROUGH MOBILE DEVICES

(71) Applicant: Daniel Lin, San Francisco, CA (US)

(72) Inventor: Daniel Lin, San Francisco, CA (US)

(73) Assignee: Pendragon Wireless LLC, Kirkland, WA (US)

( * ) Notice: Subject to any disclaimer, the term of this patent is extended or adjusted under 35 U.S.C. 154(b) by 0 days.

(21) Appl. No.: 13/759,950

(22) Filed: Feb. 5, 2013

(65) Prior Publication Data

US 2013/0295942 A1 Nov. 7, 2013

Related U.S. Application Data

(63) Continuation of application No. 13/463,540, filed on May 3, 2012, now Pat. No. 8,369,298.

(51) Int. Cl.
*H04W 4/00* (2009.01)
(52) U.S. Cl.
USPC ...................................................... 370/338
(58) Field of Classification Search
USPC ...................................................... 370/338
See application file for complete search history.

(56) References Cited

U.S. PATENT DOCUMENTS

| | | | | |
|---|---|---|---|---|
| 6,664,891 | B2* | 12/2003 | Davies et al. | 340/505 |
| 7,113,801 | B2* | 9/2006 | Back et al. | 455/466 |
| 7,206,574 | B2* | 4/2007 | Bright et al. | 455/426.1 |
| 7,236,472 | B2* | 6/2007 | Lazaridis et al. | 370/328 |
| 7,272,387 | B2* | 9/2007 | Hsu et al. | 455/414.1 |
| 7,395,078 | B2* | 7/2008 | Roth | 455/466 |
| 7,509,136 | B2* | 3/2009 | Hart et al. | 455/466 |
| 7,634,281 | B2* | 12/2009 | Kalavade | 455/466 |
| 7,702,340 | B2* | 4/2010 | Pournasseh et al. | 455/466 |
| 2002/0155826 | A1* | 10/2002 | Robinson et al. | 455/412 |
| 2002/0165000 | A1* | 11/2002 | Fok | 455/466 |
| 2003/0126213 | A1* | 7/2003 | Betzler | 709/206 |
| 2004/0266426 | A1* | 12/2004 | Marsh et al. | 455/426.2 |
| 2005/0021645 | A1* | 1/2005 | Kulkarni et al. | 709/206 |
| 2005/0058094 | A1* | 3/2005 | Lazaridis et al. | 370/328 |
| 2005/0101342 | A1* | 5/2005 | Chuang | 455/550.1 |
| 2005/0221813 | A1* | 10/2005 | Rajahalme et al. | 455/422.1 |
| 2008/0055269 | A1* | 3/2008 | Lemay et al. | 345/173 |
| 2008/0123685 | A1* | 5/2008 | Varma et al. | 370/466 |
| 2008/0293389 | A1* | 11/2008 | Chin et al. | 455/414.1 |

\* cited by examiner

*Primary Examiner* — Nathan Mitchell
(74) *Attorney, Agent, or Firm* — Law Offices of John Stattler, PC

(57) ABSTRACT

A technique is provided for a seamless and transparent handoff from a user's mobile device to the user's stationary terminal of a network address of a remote device for the purpose of establishing a direct communication channel between the stationary terminal and a remote device, where the remote device first contacted the user's mobile device to initiate communications with the users.

20 Claims, 3 Drawing Sheets

METHOD FOR ESTABLISHING NETWORK CONNECTIONS BETWEEN STATIONARY TERMINALS AND REMOTE DEVICES THROUGH MOBILE DEVICES

CROSS REFERENCE TO RELATED APPLICATIONS

This application is a continuation of U.S. patent application Ser. No. 13/463,540, filed May 3, 2012, which is a continuation of U.S. patent application Ser. No. 12/896,686, filed Oct. 1, 2010, which is a continuation of U.S. patent application Ser. No. 11/288,505, filed Nov. 28, 2005, now U.S. Pat. No. 7,817,606, which is: a continuation-in-part of U.S. patent application Ser. No. 10/817,994, filed Apr. 5, 2004, now U.S. Pat. No. 7,961,663; a continuation-in-part of U.S. patent application Ser. No. 10/935,342, filed Sep. 7, 2004, now U.S. Pat. No. 7,764,637; a continuation-in-part of U.S. patent application Ser. No. 11/042,620 filed Jan. 24, 2005, now U.S. Pat. No. 7,773,550; a continuation-in-part of U.S. patent application Ser. No. 11/091,242, filed Mar. 28, 2005, now U.S. Pat. No. 7,672,255; a continuation-in-part of U.S. patent application Ser. No. 11/182,927, filed Jul. 15, 2005, now U.S. Pat. No. 7,502,335, all of which are hereby incorporated by reference.

FIELD OF THE INVENTION

The present invention relates generally to messaging techniques for mobile devices, and more specifically, a technique for transferring network addresses from mobile devices to more stationary terminals such as laptops, desktops and workstations in order to establish communication with remote devices (i.e., either mobile devices or stationary terminals).

BACKGROUND OF THE INVENTION

Mobile data communications techniques described in U.S. patent application Ser. No. 10/817,994, entitled "Peer-to-Peer Instant Messaging Method and Device" (the '994 Application") teach embedding an IP address into a message that is transmitted through a page-mode messaging service, such as Short Message Service (SMS), in order to establish a virtual connection, such as a TCP connection between mobile devices in order to exchange data for any purposes, including for instant messaging (IM).

However, when a user is actively engaged or focused t a more stationary terminal, such as a laptop, desktop or workstation, diverting his attention from the stationary terminal in order to answer or otherwise use his mobile device (e.g., smart phone) for communications purposes or to receive or send data becomes inconvenient.

From a networking perspective, as of the date of this disclosure, the bandwidth and transmission speeds of mobile networks which rely on wireless cellular telephony radio technologies such as 2.5G and 3G are still significantly less than that achieved by more traditional broadband networks such those accessed by DSL, cable modems and Wi-Fi radio technologies. As such, what is needed is a technique to utilize the broadband networks accessible by stationary terminals for communications that are initiated through mobile devices using wireless cellular telephone radio technologies in order to provide smoother integration from being mobile to being stationary.

System of the Invention

The present invention provides a technique for providing a network address from a user's mobile device to his stationary terminal during a communication attempt by a remote terminal or remote mobile device. In accordance with the present invention, when a mobile device and a stationary terminal are sufficient close to one another, the mobile device and stationary terminal automatically establish a communication link through a short-range wireless communication technology such as Bluetooth. The user's mobile device may subsequently receive an invitation message containing a network address associated with a remote device (stationary terminal or mobile) which the user's mobile device is intended to access in the event the user desires to establish a virtual connection with the remote terminal or remote mobile service. As described in the Background Section above, such as initiating message may be transmitted by the remote terminal or remote device though a page-mode messaging service, such as SMS, supported by the underlying digital cellular mobile network system. The user's mobile device forwards the network address in the invitation message to the stationary terminal through the communication link established by the short-rang wireless communication technology (e.g., Bluetooth). The stationary terminal receives the network address and establishes a direct virtual network connection (such as a TCP connection) with the remote mobile device or remote terminal. Once the virtual network connection is established, data may be exchanged between the stationary terminal and the remote device, including through IM sessions.

DETAILED DESCRIPTION OF THE INVENTION

Figure 1:
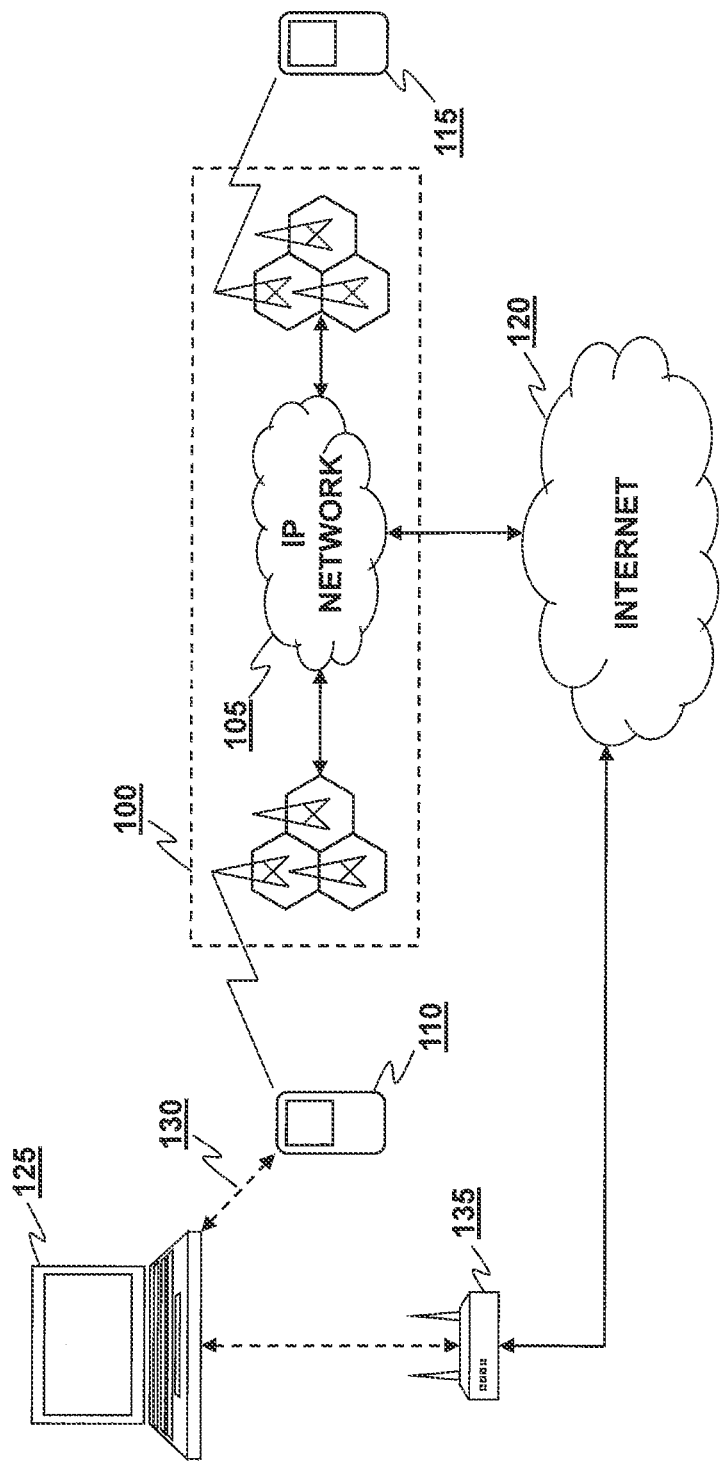
FIG. 1 depicts an environment in which an embodiment of the present invention may be deployed.

FIG. 1 depicts one environment to deploy an embodiment of the present invention. The underlying digital cellular wireless network system 100 in this environment may be the General Packet Radio Service (GPRS). Other possible digital cellular wireless network systems would include, without limitation, all other forms of 2.5G and 3G (e.g. UMTS, CDMA2000, etc.) packet-switched cellular wireless technologies. Due to its packet-switching capability, GPRS is able to implement an IP-based network 105 that supports TCP/IP transmission protocol based communication between mobile devices, such as mobile devices 110 and 115. A current commercial example of a mobile device (e.g., smartphone, PDA, handheld, etc.) that might be used in FIG. 1 could be Research in Motion's (RIM) BlackBerry handheld devices, which supports cellular communication technologies and includes a QWERTY keyboard to facilitate the typing of text. Additionally, the digital cellular wireless network system 100 may also support page-mode messaging services such as SMS. The digital cellular wireless network system 100 may also provide access to the Internet 120 through its IP-based network capabilities.

Mobile device 110 also supports a short-range wireless technology such as Bluetooth. For example, mobile device 110, playing the role of a Bluetooth client or slave, discovers that a stationary terminal or laptop 125 within short-range proximity is playing the role of a Bluetooth server or master and is advertising as Bluetooth service relating to an IM communication application. In accordance with the Bluetooth specification, the mobile device 110 and the stationary terminal 125 establish a communication link or a piconet 130. Those skilled in the art will recognize that establishing a Bluetooth communications link between the mobile device 110 and the laptop 125 may be implemented in a variety of ways (i.e., not necessarily with mobile device 110 serving as slave and the laptop 125 serving as master) that are all considered to be within the scope of the present invention.

The laptop 125 also supports access to the internet 120. In the embodiment of an environment for the present invention depicted in FIG. 1, the laptop's 125 access to the internet is implemented through the use of an IEEE 802.11 or Wi-Fi router 135 connected to broadband access to the Internet 120, although those skilled in the art will recognize that the laptop's 125 access to the Internet can be implemented in a variety known techniques.

Figure 2:
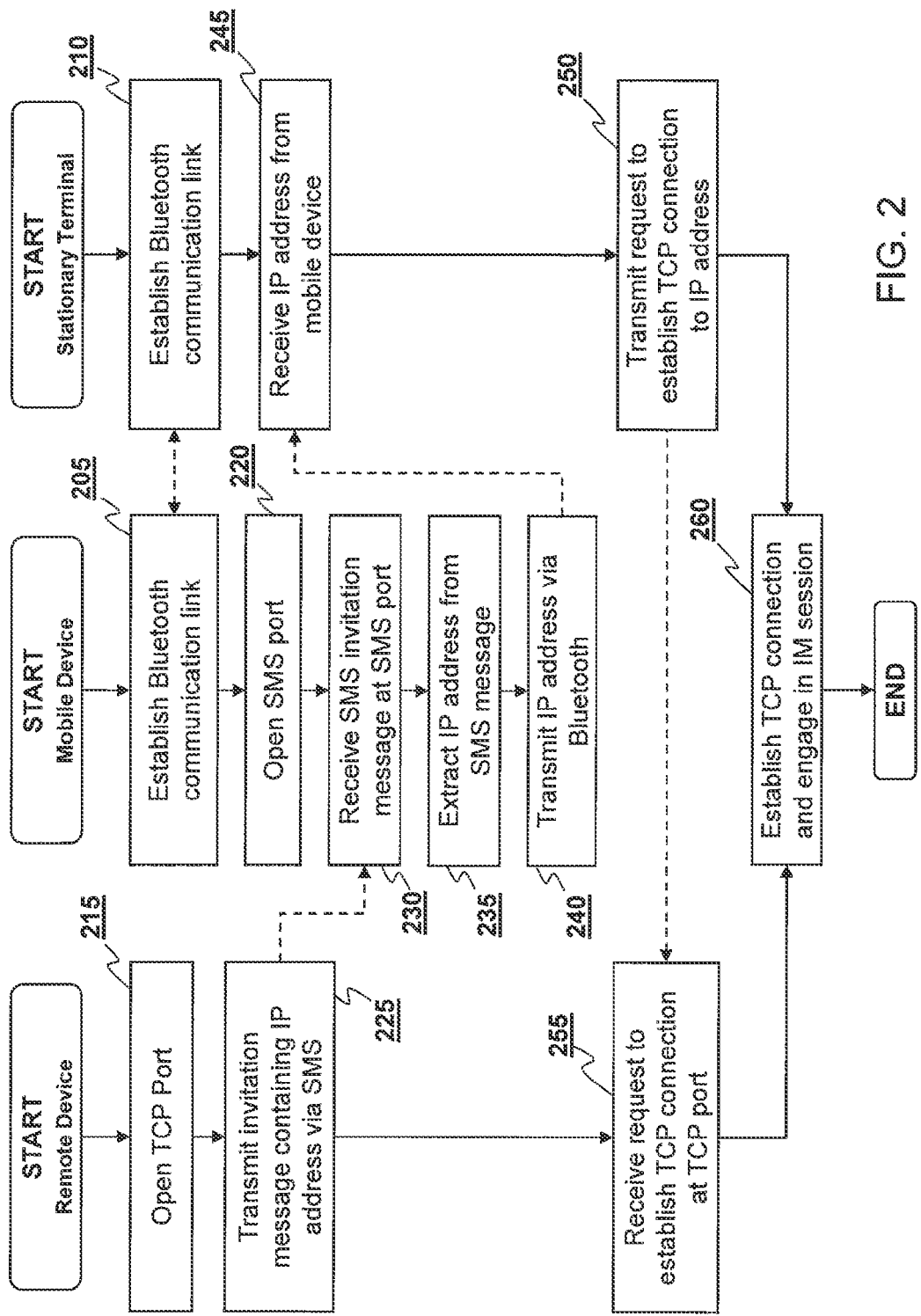
FIG. 2 depicts a flow chart for establishing a network connection between a stationary terminal and an initiating remote device through a mobile device.

FIG. 2 depicts a flow chart for establishing a network between a stationary terminal and an initiating remote device through a mobile device in accordance with the present invention. Initially, in steps 205 and 210, when the user carrying mobile device 110 has focused his attention to his laptop 125 and the mobile device 110 is within sufficient short-range proximity to the laptop 125, the mobile device 110 and the laptop 125 discover each other's existence and automatically establish a Bluetooth (or other short-range wireless technology) communication link in support of an IM application (or any other data transfer application) related to a particular Bluetooth service. In accordance with the Bluetooth protocol, mobile device 110 and the laptop 125 may establish (or may have already established through prior communications) a trusted relationship by learning through the user's input a shared secret or passkey. Such a trusted relationship enables mobile device 110 and the laptop 125 to cryptographically authenticate the identified of the other. Authentication is useful, for example, if the IM application residing on the laptop 125 requires verification that user of the mobile device 110 is same individual as that identified in the IP application (e.g., via a username and password protocol) as the user engaged in IM communications with third parties on the laptop 125.

A remote device (either stationary or mobile), such as remote mobile device 115 depicted in FIG. 1 initiates a request to establish an IM session with mobile device 110 by transmitting an invitation message containing an IP address related to the remote mobile device 115 through SMS supported by the cellular wireless network system 100. As further described and depicted in the '994 Application, remote mobile device 115 opens a TCP port to listen for communications from the mobile device 110 (step 215). Mobile device 110 has also similarly opened an SMS listening port to receive invitation SMS text messages at a specified SMS port (step 220). The remote mobile device then transmits its IP address (and TCP port) in an invitation SMS text message to the telephone number and the specified SMS port of mobile device 110 (step 225). Mobile device 110 receives the SMS message containing remote mobile device's 115 IP address (and TCP port) at the specified SMS port (step 230). Mobile device 110 extracts the IP address and TCP port from the SMS text message (step 235).

However, because the user is currently focused upon working on his laptop 125 rather than his mobile device 110, diverting the user's attention to engage in an IM session on his mobile device 110 rather than his laptop 125 is undesirable. The live Bluetooth connection link between the mobile device 110 and the laptop 125 signals a preference of the user to engage in IM communications through the laptop 125 rather than mobile device 110 (although those skilled in the art will recognize that such user preferences could be programmed to be dynamically modifiable by the user in an envision IM application, including, for example and without limitation, providing the user the capability to actively disconnect or reject the Bluetooth link between the mobile device 110 and laptop 125 if the user prefers to use the mobile device 110 despite its proximity to the laptop 125). As such, in step 240 of FIG. 2, mobile device 110 transmits the IP address (and TCP port) received from the remote mobile device 115 to the laptop 125 through the Bluetooth link 130 to the appropriate Bluetooth service relating to the IM application residing on the laptop 125.

In step 245, the laptop 125 receives the IP address (and TCP port) related to the remote mobile device 115 and transmits a request in step 250 to establish a TCP connection with such remote mobile device 115 though such IP address (and TCP port). As depicted in the embodiment of FIG. 1, such a connection is routed through the laptop's wireless connection to Wi-Fi router 135 and ultimately through the Internet 120. Because the remote mobile device 115 is also able to access the Internet through GPRS, the remote mobile device 115 receives this request, as depicted in step 225 and a TCP connection is established between the IP addresses of the laptop 125 and the remote mobile device 115 and these devices are able to engage in an IM or other data transfer session over a reliable virtual connection directly between the two devices, without the continued participation of mobile device 110 (step 260).

Figure 3:
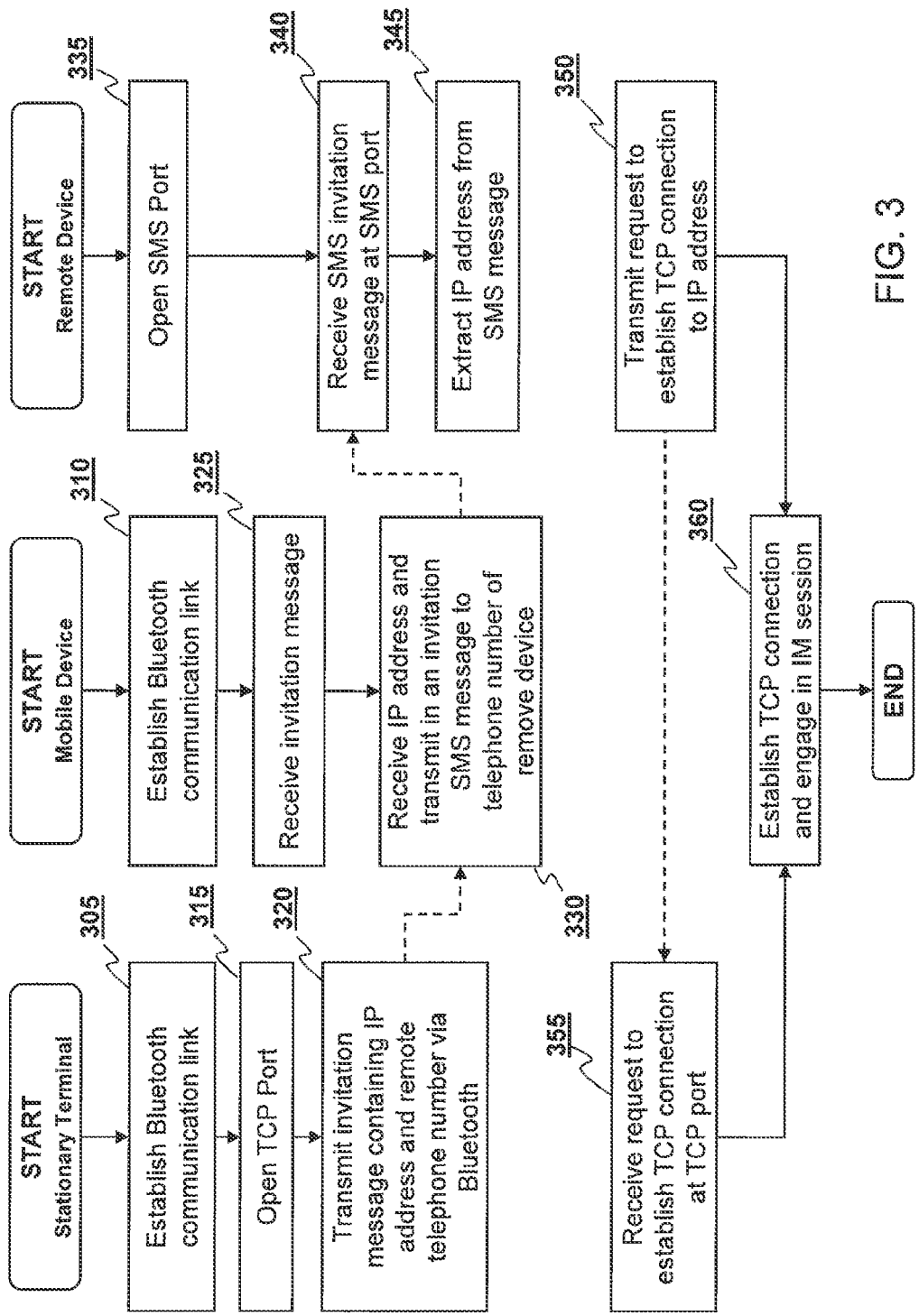
FIG. 3 depicts a flow chart for establishing a network connection between an initiating stationary terminal and a remote device through a mobile device.

Similarly, once a user has stopped moving and is focused on a stationary terminal such as the laptop 125, the user may nevertheless desire to initiate IM communication of other data transfers with third parties that are on a remote mobile device such as 115. FIG. 3 depicts a flow chart for establishing a network connection between an initiating stationary terminal and a remote device through a mobile device in accordance with the present invention. Similar to FIG. 2, in steps 305 and 310, when the user carrying mobile device 110 has focused his attention to his laptop 125 and mobile device 110 is within sufficient short-range proximity to the laptop 125, the mobile device 110 and the laptop 125 discover each other's existence and automatically establish a Bluetooth (or other short-range wireless technology) communication link in support of an IM application (or any other data transfer application) related to a particular Bluetooth service. In step 315, the laptop 125 prepares to initiate a request to establish an IM session with remote mobile device 115 by opening a TCP port. In step 320, the laptop 125 transmits an initiation message containing its IP address (and opened TCP port) and the cellular telephone number of the remote mobile device 115 to the mobile device 110 through the Bluetooth communication link. After mobile device 110 receives the initiation message in step 325, in step 330, its extracts the IP address and TCP port and transmits them in an invitation SMS message which may be directed to a specified SMS port (as in FIG. 2) to the cellular telephone number of the remote device 115. Because the remote mobile device 115 has also similarly opened the specified SMS listening port to receive invitation SMS text messages at the specified SMS port in step 335, it is able to receive the SMS message (step 340) and extract the IP address and TCP port of the laptop 125 in step 345. In step 350, the remote mobile device 115 transmits a request is to establish a TCP connection with the IP address and TCP port of the laptop 125 and when the laptop 125 receives the request in step 355, these devices are able to engage in an IM session over an established reliable virtual connection directly between the two devices, without the participation of mobile device 110 (step 360).

The present invention utilizes the short-range wireless technology communication link (e.g. Bluetooth) between the mobile device and the stationary terminal as an indication as to whether the user is focused on his mobile device or his stationary terminal (e.g., laptop, desktop, workstation, etc.) in order to create more seamless and transparent interactions and handoffs between mobile devices and stationary terminals with respect to IM communications and other data transfers. For example and without limitation, when a Bluetooth communication link is between a stationary terminal and mobile device is established, the presumption is that the user is focused on the stationary terminal rather than the mobile device due to the proximity of the terminal and the mobile device. Under such presumption, communication attempts to the mobile device should be routed to the stationary terminal and dealt with using resources of the stationary terminal. In contrast, when a Bluetooth communication link is not established, the mobile device serves as the primary communications tool for the user since the user is presumed to be mobile and away from the stationary terminal.

Software developed to implement the present invention in the context of IM may also integrate the techniques herein with other known IM technologies. For example and without limitation, software developed for the stationary terminal portion of this invention may also be transparently integrated with AOL's Instant Messenger, Microsoft's .NET Messenger Service, Yahoo! Messenger, Skype Chat, Google Talk, ICQ, IRC and any other commercial IM technologies or chat clients that unify the foregoing commercial technologies (e.g., Trillian, Jabber, etc.). Similarly, the user experience may also be flexible and varied depending upon the development of the software implementing the present invention. In one embodiment of the present invention, from the user experience perspective, the mobile device behaves in the same manner as if one were dialing a telephone number or answering a telephone call. For example, and without limitation, the remote mobile device 115 dials the cellular telephone number of the mobile device 110. If the mobile device 110 was not within the proximity of the stationary terminal 125 such that a Bluetooth connection was established, then the mobile device 110 would ring, and if the user chooses, he is able to answer the call and engage in a IM, just like a typical voice call (in accordance with the teachings of the '944 Application). In contrast and in accordance with the present invention, if the mobile device 110 is within the proximity of the stationary terminal 125 and a Bluetooth connection is established, the mobile device 110 would stay silent upon a call (via SMS) from the remote mobile device 115, but the active IM application on the laptop 125 would alert the user that the remote mobile device 115 is attempting to establish an IM session with the user. If the user chooses, he may agree to establish an IM session with the remote mobile device 115. From the perspective of the remote mobile device 115, it need not be aware whether the user is stationary and focused on his laptop 125 or whether the user is mobile and utilizing his mobile device 110 when initiating IM communications.

While the foregoing detailed description has described the present invention using SMS, GPRS, TCP/IP, Bluetooth, Wi-Fi and IM, other similar services and protocols may be used in a variety of similar environments in which the present invention may be implemented. For example and without limitation, rather than using SMS as the page-mode messaging service to transmit an IP address (and port) from the mobile device 110 to the remote mobile device 115 through the devices' telephone numbers, an alternative embodiment of the present invention might use a PIN-to-PIN messaging technology (as, for example, offered in RIM's Blackberry handheld devices) to transmit the IP address (and port) through unique PIN numbers associated with the mobile devices, email push technology, or an alternative paging protocol using telephone numbers. Similarly, while IM sessions have been used as the primary example for the present invention, the techniques can be applied to any type of data transfer between mobile and stationary devices that can automatically establish communication links though a short-range wireless technology such as Bluetooth, utilize digital cellular wireless technologies such as SMS, and support access to TCP/IP communication both through broadband access to the Internet and through the digital cellular wireless technologies. Furthermore, the present invention contemplates that the actual protocol used during an established IM session may also vary depending upon the preference of the implementation. For example and without limitation, Message Session Relay Protocol (MSRP) or any proprietary based protocol may be used during the IM session that is established in accordance with the present invention. Thus, various modifications, additions and substitutions and the like can be made without departing from the spirit of the invention and these are therefore considered to be within the scope of the invention as defined in the following claims.

What is claimed is:

1. A method for establishing a data communications session between a stationary terminal and a remote device using a mobile device proximate to the stationary terminal, the method comprising:
   establishing a communication link through a wireless communication technology between the stationary terminal and the proximate mobile device wherein the proximate mobile device operates within a cellular wireless network system;
   opening a listening port on the proximate mobile device to receive communications through a push messaging service;
   receiving, at the listening port and through the push messaging service, a message from the remote device, wherein such message comprises a network address and listening port related to the remote device; and
   transmitting the network address and listening port received by the mobile device to the stationary terminal though the wireless communication technology, wherein the stationary terminal receives the network address and listening port, transmits a response to the network address and listening port related to the remote device, and establishes a data connection with the remote device for data communications.

2. The method of claim 1, wherein the wireless communication technology comprises Bluetooth.

3. The method of claim 1, wherein the wireless communication technology comprises WiFi.

4. The method of claim 1, wherein the push messaging service comprises SMS.

5. The method of claim 1, wherein the cellular wireless network system supports TCP/IP based communications, the listening port comprises a TCP port and the data connection comprises a TCP connection.

6. The method of claim 1, wherein the network address comprises an IP address.

7. The method of claim 6, wherein the data communication includes a voice call.

8. The method of claim 6 where the data communication includes an instant messaging session.

9. The method of claim 1, wherein the message from the remote device is associated with a voice call.

10. The method of claim 9, wherein the stationary station alerts the user of the voice call.

11. A non-transitory computer-readable storage media encoded with a computer program for establishing a data communications session between a stationary terminal and a remote device using a mobile device proximate to the stationary terminal, the computer program comprising computer executable instructions for:
- establishing a communication link through a wireless communication technology between the stationary terminal and the proximate mobile device wherein the proximate mobile device operates within a cellular wireless network system;
- opening a listening port on the proximate mobile device to receive communications through a push messaging service;
- receiving, at the listening port and through the push messaging service, a message from the remote device, wherein such message comprises a network address and listening port related to the remote device; and
- transmitting the network address and listening port received by the mobile device to the stationary terminal though the wireless communication technology, wherein the stationary terminal receives the network address and listening port, transmits a response to the network address and listening port related to the remote device, and establishes a data connection with the remote device for data communications.

12. The media of claim 11 wherein the wireless communication technology comprises Bluetooth.

13. The media of claim 11 wherein the wireless communication technology comprises WiFi.

14. The media of claim 11 wherein the push messaging service comprises SMS.

15. The media of claim 11 wherein the cellular wireless network system supports TCP/IP based communications, the listening port comprises a TCP port and the data connection comprises a TCP connection.

16. The media of claim 11 wherein the network address comprises an IP address.

17. The media of claim 16, wherein the data communication includes a voice call.

18. The media of claim 16 where the data communication includes an instant messaging session.

19. The media of claim 11 wherein the message from the remote device is associated with a voice call.

20. The media of claim 19 wherein the stationary station alerts the user of the voice call.

* * * * *